Dec. 26, 1967   A. F. TURNER   3,359,955
ROTARY ENGINE COMBUSTION CHAMBER
Filed April 18, 1966   2 Sheets-Sheet 1

INVENTOR.
ALEC FREDERICK TURNER
BY
ATTORNEY

United States Patent Office 3,359,955
Patented Dec. 26, 1967

3,359,955
ROTARY ENGINE COMBUSTION CHAMBER
Alec F. Turner, Glen Rock, N.J., assignor to Curtiss-Wright Corporation, a corporation of Delaware
Filed Apr. 18, 1966, Ser. No. 543,366
14 Claims. (Cl. 123—8)

This invention relates to rotary combustion engines and is particularly directed to a novel combustion chamber construction for said engines.

A major consideration in the design of combustion engines of today is directed at improving the combustion efficiency. As is well known, because the combustible charge in combustion engines is not always completely consumed during the combustion phase, the exhaust products effected from the engine contain elements which contribute to the problem of air pollution. Some of these products may be toxic and are considered a hazard in that they contaminate the atmosphere. Further, as will also be obvious, incomplete combustion of the combustible charge is very inefficient in itself in that it tends to increase the fuel consumption of the engine. The present invention has for its prime object the provision of a combustion chamber construction which promotes efficient combustion of the combustible charge which results in better fuel consumption and will minimize the problem of unburnt contaminants in the exhaust products ejected from the engine.

The invention is generally carried out by providing a combustion chamber cutout in each working face of the piston or rotor which combustion chamber cutout comprises two spaced substantially cup-shaped cavity portions interconnected by a relatively shallow passage. The curved surfaces of the cavity portions promote swirling of the combustible charge and the interconnecting passage serves to exploit local high velocity of the combustible charge for inducing a swirl effect in the cavity portions. In other words, during relative rotation of the rotor, gases passing from one cavity to another through the interconnecting passage undergo an increase in velocity which induces a swirling effect as the gases leave the interconnecting passage and enter the curve surface of a cavity portion. The resulting turbulence of the gases will enhance a more complete combustion of the combustible charge by increasing the velocity of the gases comprising the combustible charge for feeding the flame front established upon ignition. The invention also contemplates the use of dual spark plugs arranged in tandem which may be disposed so as to permit simultaneous ignition of the combustible charge in each of the spaced cavity portions which will reduce the time required for the flame to consume the entire charge in all portions of the cavity portions, thus insuring that combustion is completed before the exhaust port is opened to the working chamber. Thus, the combustion chamber construction also promotes uniformity in the distance the flame front travels between the point of flame propagation and the extremities of the combustion chamber which will enhance more complete combustion of the combustible charge, since non-uniformity in flame front travel can result in flame quenching due to early impingement on chamber walls.

Accordingly, it is one object of the invention to provide a novel and improved combustion chamber construction for a rotary combustion engine.

It is another object of the invention to provide a novel combustion chamber construction for a rotary combustion engine which promotes complete combustion of the combustible charge in the working chambers of said rotary combustion engine.

It is a further object of the invention to provide a novel and improved combustion chamber construction for a rotary combustion engine which achieves highly efficient combustion of the fuel and minimizes unburned hydrocarbons which would otherwise be ejected by way of the exhaust system into the atmosphere and also provides for greater fuel consumption efficiency.

Other objects and advantages of the invention will become apparent upon reading the following detailed description wherein.

Figure 1:
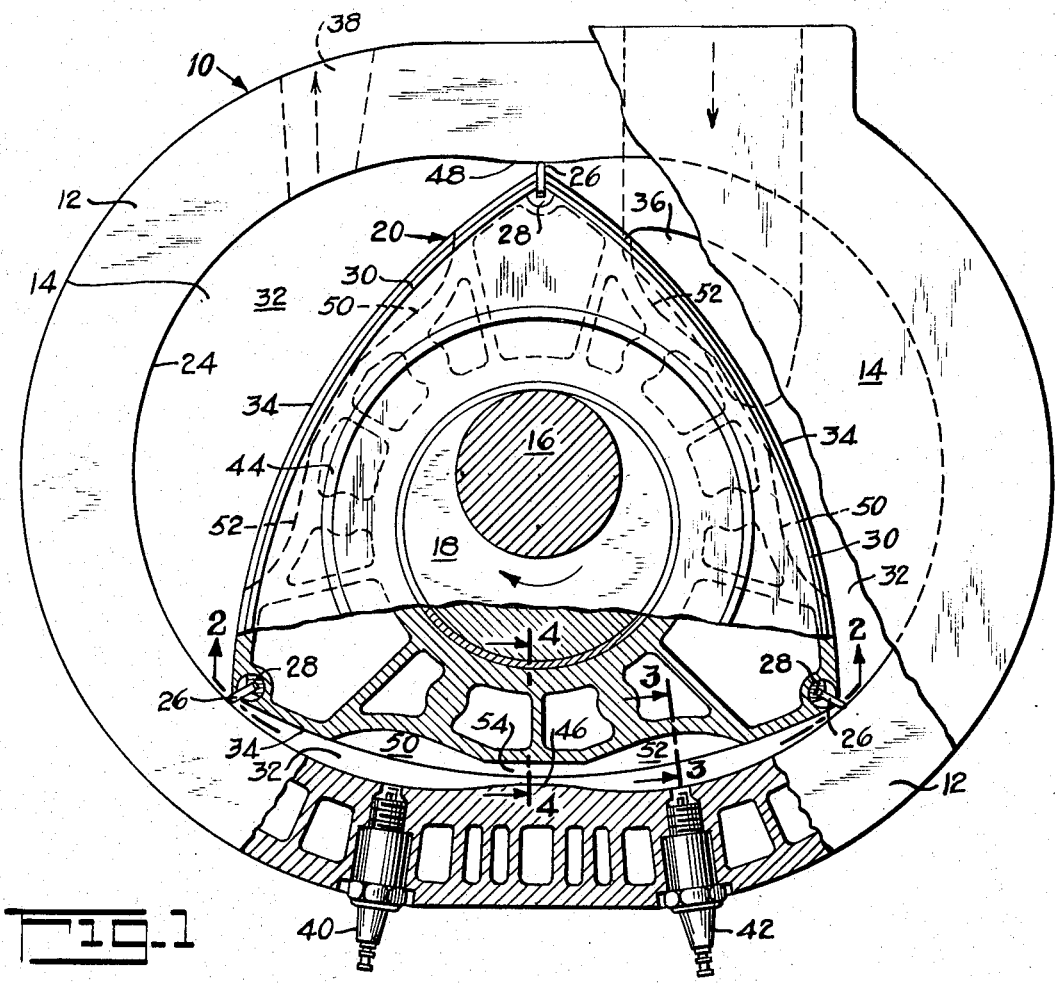
FIG. 1 is an end view of a rotary combustion engine embodying the invention with portions thereof shown in section.
Figure 2:
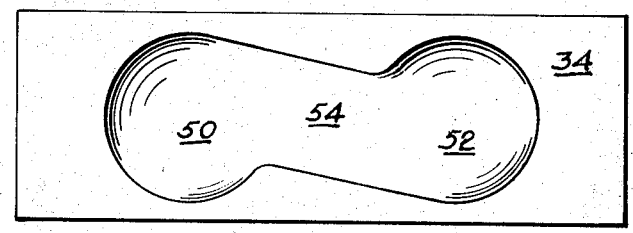
FIG. 2 is a view of the combustion chamber of the invention taken in the direction of line 2—2 of FIG. 1.

Referring to FIG. 1, there is shown therein an end view of a rotary combustion engine generally designated at 10 with portions thereof shown in section. Although the invention is preferably embodied in a rotary combustion engine of the type illustrated in FIG. 1, it should be understood that the invention is not so limited. The rotary combustion engine 10 comprises an outer body formed by a peripheral wall or rotor housing 12 interconnected with a pair of end walls or housing designated at 14. As illustrated, the contour of the inner surface of the peripheral wall 12 has a multi-lobed profile which is preferably basically a two-lobed epitrochoid. A shaft 16 is rotatably supported within the outer body 12 by suitable bearings (not shown) with said shaft 16 having an eccentric portion 18 formed thereon. A rotor 20 is rotatably supported on the eccentric portion 18, also by suitable bearings, with said rotor preferably having three lobes joined together to form three apex portions. It should be understood that the invention is not limited to the specific embodiment shown having a two-lobed cavity and a three-lobed rotor and other combinations may be used.

The apex portions of the rotor are disposed in sealing engagement with the inner surface 24 of the outer body peripheral wall 12. Each apex portion is provided with a groove which carries a seal strip 26 for maintaining sealing between the rotor apex portions and the inner surface 24. The seal strips 26 mate with intermediate seal bodies 28, also disposed in each apex portion of the rotor, and with side face seals 30 disposed in grooves in each side face of the rotor to thereby form a continuous seal for each of the working chamber 32 defined between the apex portions of the rotor, the inner surface of the peripheral wall 24, and each working face 34 of the rotor. It will be apparent therefore that, as the rotor and outer body rotate relative to one another, the working chamber 32 will vary in volume. Suitable gearing between the shaft 16 and the rotor 20 may also be provided for guiding the rotor in tracing its epitrochoidal path, said gearing not being illustrated. Reference may be made to United States Patent No. 2,988,065, issued to Felix Wankel et al., for a more detailed description of the gearing and sealing construction.

An intake port 36 may be provided in an end wall, as illustrated, or in the peripheral wall for admitting air or a fuel-air mixture to supply the combustion zone of the engine, an exhaust port 38 is provided for expelling the burnt gases from the engine and an ignition means, preferably comprising spark plugs 40 and 42, may be provided for igniting the fuel-air mixture as will be explained in greater detail below. It will be seen that the stages of intake, compression, expansion, and exhaust will be carried out during operation of the engine. An oil seal 44 is also provided for preventing oil, which is used in lubricating the shaft bearings and for cooling the interior of the rotor, from leaking radially outwardly into the working chambers 32, which oil seal 44 is disposed for sealing contact between the rotor end faces and the adjacent end faces of the outer body end housings 14. The engine so far described is considered conventional and reference may be made to the above-mentioned patent to Felix Wankel et al. for a more complete description of the structure and operation of said engine.

As explained above, the prime purpose of the invention is to provide a combustion chamber which will provide more efficient combustion of the combustible charge in each of the working chambers so that the fuel consumption will be improved and contaminants in the exhaust will be substantially minimized. Referring again to FIG. 1, it will be seen that the inner surface of the peripheral wall has two lobe junctions 46 and 48 which define, with the rotor working faces 34, chambers of minimum volume during relative rotation of the rotor 20. It will be further seen that, as the rotor rotates in the direction of the arrow shown on said rotor in FIG. 1 and approaches the lobe junction 48, the distance between the lobe junction and the working face of the rotor will be a minimum. In order to permit the combustible charge supplied through the intake port 36 to pass across from one side of the lobe junction to the other, a cutout portion is provided in each working face 34 of the rotor. It will be seen that the cutout portion in each of said working faces 34 along with the remainder of the working face and the opposed inner surface 24 of the outer body peripheral wall make up the combustion chamber shape.

Figure 3:
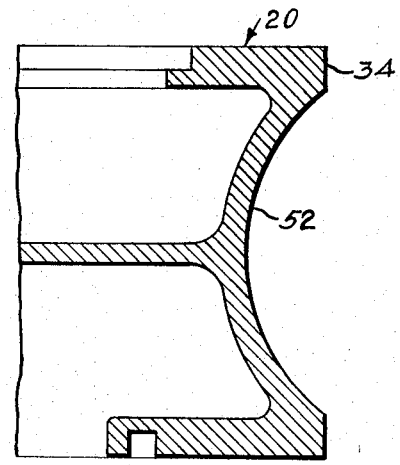
FIG. 3 is a sectional view taken of the combustion chamber cutout taken along line 3—3 of FIG. 1.
Figure 4:
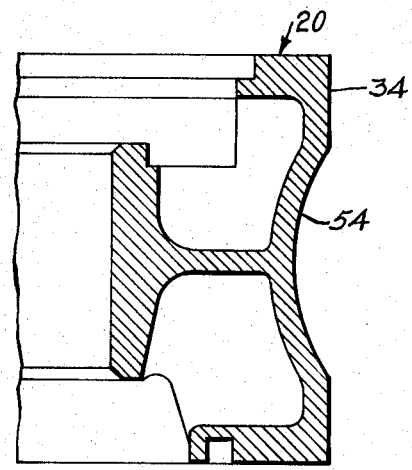
FIG. 4 is a sectional view of the combustion chamber cutout taken along line 4—4 of FIG. 1.

In accordance with the present invention, the cutout portion on each working face is characterized by a particular shape which promotes substantially complete combustion of all the combustible mixture in the combustion chamber. Referring to FIGS. 1–4 it will be seen that the combustion chamber cutout in each working face comprises a pair of spaced cavity portions 50 and 52 which are interconnected by a gas transfer passage 54. Preferably each of the cavity portions 50 and 52 has curved wall portions and is formed as a cup-shape or more specifically, preferably a hemispherical shape. The curved walls of the cavities 50 and 52 promote a swirling action of the combustible charge disposed therein which, during rotation of the rotor toward a position of minimum chamber volume, causes the gases to be under substantial turbulence or swirling action in said cavity portions. The interconnecting gas transfer passage 54 is disposed at an incline angle relative to the circumferential axis of the rotor so that during gas transfer, in particular, when the combustion chamber cutout is disposed opposite the lobe junction portion 48 wherein the gases will transfer between the cavities 50 and 52, the gases transferring from one cavity portion to the other will flow into said cavity portion at substantially a tangent to the curved inner surface of a respective cavity portion for inducing a high velocity swirl action. As shown in FIGS. 1, 3 and 4, it will be seen that the gas transfer passage 54 has a substantially more shallow or smaller depth cut into the rotor working face than the cavity portions 50 and 52 so that when the gas transfer passage, for example, is disposed opposite the lobe junction portion 48, the area of the gas transfer passage 54 will be substantially restricted, which induces a local high velocity to the gas in said passage for further inducing a swirl effect in the leading cavity portion with reference to the direction of rotor rotation. It will be seen therefore that if combustion is initiated in the swirling gases of one of the cavity portions, a flame front will be established which will be fed with relatively high velocity combustible gases through the gas transfer passage which will swirl in the cavity portions to feed the flame front, thus promoting the prospect of achieving complete combustion of the combustible charge in the working chamber. Therefore, the flame front established through ignition of the combustible charge in either one or both of the cavity portions will be relatively rapidly fed with highly turbulent and relatively high velocity fresh combustible charge so that the complete combustible charge will be relatively rapidly consumed before the working chamber rotates into communication with the exhaust port 38. As is well known, if the combustible charge can be substantially completely consumed, any contaminants in the combustible charge will be consumed by the flame and minimize the chance of said contaminants being exhausted into the atmosphere in an unburned condition.

As further shown in FIG. 1, two spark plugs 40 and 42 may be provided with either one or both being activated by well known ignition means (not shown) in accordance with a desired mode of operation of the engine. The two spark plugs 40 and 42 are circumferentially-spaced in the outer body peripheral wall and are disposed at a distance from one another which is substantially equal to the spacing between the axis of each of the cavity portions 50 and 52. The tandem arrangement of the spark plugs permits simultaneous initiation of combustion in both of the cavity portions 50 and 52 which will therefore reduce the time required for the flame to reach the combustion chamber extremities and will thus insure that combustion is completed before the working chamber communicates with the exhaust port 38. In other words, due to the nature of the combustion chamber comprising the spaced cavity portions 50 and 52 connected by the transfer passage 54 and the use of two spark plugs activated simultaneously, the distance which the flame front travels between the point of flame propagation and the extremities of the combustion chamber will be substantially uniform, thus eliminating the possibility of the flame front being partially quenched by premature contact with a combustion chamber wall located too close to the propagation point of the flame.

It will be seen from the above description that a combustion chamber construction is provided for a rotary combustion engine wherein the combustible charge contained in the combustion chamber is induced to undergo a swirling action to cause turbulence of the combustible charge so that when a flame front is initiated, the combustible charge will be relatively rapidly fed to the flame front for promoting relatively rapid and complete combustion of the combustible charge in the working chamber. Further, due to the nature of the combustion chamber combustion will be substantially completed before the working chamber is rotated into communication with the exhaust port so that substantially all the fuel contained in the working chamber will be burnt along with any contaminants therein so that the exhaust gases ejected into the atmosphere will be relatively free of contaminants, further, the combustion of the combustible charge will be highly efficient so as to improve the engine fuel economy.

While the invention has been set forth in detail in the above description, it should be understood that the invention is not to be limited by the specific details set forth therein and that various modifications and changes may be made by those skilled in the art without departing from spirit and scope of the invention as defined in the following claims.

What is claimed is:

1. In a rotary combustion engine including an outer body having a cavity and a rotor disposed in said cavity for relative rotation with said outer body, said rotor including a plurality of working faces which cooperate with said outer body to define a plurality of working chambers therebetween; intake means for supplying air to said working chambers for supporting combustion therein; ignition means for initiating combustion of the working fluid in said working chambers whereby relative rotation of said rotor is produced; and said working faces each including two spaced cavity portions each having a curved cross-section for producing swirling of the working fluid in said cavity and said cavity portions being interconnected by a working fluid transfer passage whereby upon ignition of said working fluid in at least one of said cavity portions a flame front will be established to which the working fluid may pass from the other of said cavity portions to said one cavity portion to promote complete combustion of the working fluid in said working chamber.

2. In a rotary combustion engine as recited in claim 1, wherein each of said cavity portions is substantially cup-shaped.

3. In a rotary combustion engine as recited in claim 1, wherein the depth of said working fluid transfer passage in said working face is relatively less than the depth of said cavity portions whereby said working fluid transfer passage induces an increase in relative velocity to the working fluid passing between said cavity portions.

4. In a rotary combustion engine as recited in claim 1 wherein said working fluid transfer passage is inclined at an angle relative to a line passing through the axis of each of said cavity portions for inducing swirling of the working fluid upon passing from said working fluid transfer passage into said cavity portions.

5. In a rotary combustion engine as recited in claim 1 wherein a wall of said working fluid transfer passage is disposed substantially tangential to a curved wall of each of said cavity portions so that working fluid passing from said working fluid transfer passage into a cavity portion will be caused to swirl relative to said cavity portion.

6. In a rotary combustiion engine as recited in claim 1 wherein the profile of the inner surface of said outer body has at least one lobe junction having a lesser radial dimensions relative to the axis of said outer body than the remainder of said inner surface so that, when said working fluid transfer passage is disposed opposite to said lobe junction, the working fluid in said working fluid transfer passage will undergo an increase in velocity.

7. In a rotary combustion engine as recited in claim 6 wherein said ignition means comprises a spark plug disposed in said outer body adjacent to said lobe junction for ignition of the working fluid in one of said cavity portions whereby a flame front will be established to which the working fluid will be transferred at relatively high velocity from said one cavity portion through said working fluid transfer passage to the other of said cavity portions.

8. In a rotary combustion chamber as recited in claim 1 wherein said ignition means comprises two circumferentially-spaced spark plugs disposed in said outer body for ignition of the working fluid in said cavity portions.

9. In a rotary combustion engine as recited in claim 8 wherein said spark plugs are circumferentially-spaced in said outer body at a distance substantially equal to the spacing between the axes of said cavity portions in a working face so that the working fluid in said cavity portions may be simultaneously ignited when said cavity portions are disposed opposite to said spark plugs.

10. A rotor for a rotary combustion engine having an outer body including a cavity with said rotor being disposed in said cavity for relative rotation therein, said rotor including at least one working face with said working face defining a wall of an associated working chamber of said rotary combustion engine, said working face having two spaced cavity portions each having a curved cross-section for producing swirling of a working fluid in said cavity during relative movement of said rotor and said cavities being interconnected by a working fluid transfer passage so that the working fluid may pass between said cavity portions.

11. A rotor for a rotary combustion engine as recited in claim 10 wherein said cavity portions each are substantially cup-shaped.

12. A rotor for a rotary combustion engine as recited in claim 10 wherein said cavity portions have a greater depth in said working face than said working fluid transfer passage.

13. A rotor for a rotary combustion engine as recited in claim 10 wherein said working fluid transfer passage is inclined relative to a line passing through the axis of each of said cavity portions so that working fluid passing into a cavity portion from said working fluid transfer passage will be directed against a curved wall of said cavity portion for inducing a swirling of the working fluid in said cavity portion.

14. A rotor for a rotary combustion engine as recited in claim 10 wherein said cavity portions each have a substantially hemispherical shape and said working fluid transfer passage has a substantially lesser depth than said cavity portions.

References Cited
UNITED STATES PATENTS 3,136,302    6/1964    Nallinger _____ 123—8
3,288,120    11/1966    Lamm _____ 123—8

RALPH D. BLAKESLEE, *Primary Examiner.*